US009232350B2

(12) United States Patent
Foy et al.

(10) Patent No.: US 9,232,350 B2
(45) Date of Patent: Jan. 5, 2016

(54) MOBILE APPLICATION USING FACILITATING DEDICATED COMMUNICATION BETWEEN SPECIFIC USERS

(71) Applicant: FORTIS RIDERS ACQUISITION CORPORATION, Greenville, SC (US)

(72) Inventors: Nathan Foy, Greenville, SC (US); James Coleman, Greenville, SC (US)

(73) Assignee: Fortis Riders Acquisition Corporation, Greenville, SC (US)

( * ) Notice: Subject to any disclaimer, the term of this patent is extended or adjusted under 35 U.S.C. 154(b) by 0 days.

(21) Appl. No.: 14/293,909

(22) Filed: Jun. 2, 2014

(65) Prior Publication Data

US 2015/0011185 A1    Jan. 8, 2015

Related U.S. Application Data

(60) Provisional application No. 61/842,215, filed on Jul. 2, 2013.

(51) Int. Cl.
*H04M 1/66* (2006.01)
*H04W 4/02* (2009.01)
*H04W 4/08* (2009.01)

(52) U.S. Cl.
CPC . *H04W 4/02* (2013.01); *H04W 4/08* (2013.01)

(58) Field of Classification Search
USPC .............. 455/410, 416; 705/5, 6, 13; 715/738
See application file for complete search history.

(56) References Cited

U.S. PATENT DOCUMENTS

| 5,661,652 | A | 8/1997 | Sprague et al. |
|---|---|---|---|
| 6,006,159 | A | 12/1999 | Schmier et al. |
| 6,292,747 | B1 | 9/2001 | Amro et al. |
| 6,360,101 | B1 | 3/2002 | Irvin |
| 6,759,972 | B2 | 7/2004 | Gupta et al. |
| 6,804,359 | B1 | 10/2004 | Yu et al. |
| 6,904,359 | B2 | 6/2005 | Jones |
| 6,958,709 | B2 | 10/2005 | Izbicki et al. |

(Continued)

FOREIGN PATENT DOCUMENTS

| EP | 2219163 A1 | 8/2010 |
|---|---|---|
| EP | 2239986 A1 | 10/2010 |

(Continued)

OTHER PUBLICATIONS

U.S. Appl. No. 13/934,026, filed Jul. 2, 2013.

*Primary Examiner* — Nathan Taylor
(74) *Attorney, Agent, or Firm* — Winston & Strawn LLP

(57) ABSTRACT

The present invention relates to a method and system for facilitating dedicated communication between specific users relating to a travel transaction, the system including a travel resource mobile application. The mobile application may be installed on a mobile device, wherein the user of the mobile application and other users are included in a group which participates in the travel transaction, and each such user is assigned a role. The mobile application may also provide travel information and secure communication to each user of the group of users, wherein the group of users may be restricted based on the travel transaction. The mobile application may retrieve user contact information from the mobile device to facilitate communication between the group of users while masking the contact information of each user. The mobile application may also determine a location of at least one user from a group of users.

18 Claims, 15 Drawing Sheets

(56) References Cited

U.S. PATENT DOCUMENTS

| | | |
|---|---|---|
| 7,136,747 B2 | 11/2006 | Raney |
| 7,162,254 B1 | 1/2007 | Smith |
| 7,479,899 B2 | 1/2009 | Horstemeyer |
| 7,840,427 B2 | 11/2010 | O'Sullivan |
| 8,078,397 B1 | 12/2011 | Zilka |
| 8,126,903 B2 | 2/2012 | Lehmann et al. |
| 8,155,669 B2 | 4/2012 | Ziskind et al. |
| 8,165,799 B2 | 4/2012 | Snavely et al. |
| 8,224,571 B2 | 7/2012 | Huang et al. |
| 8,249,565 B2 | 8/2012 | Link, II et al. |
| 8,284,748 B2 | 10/2012 | Borghei |
| 8,285,571 B2 | 10/2012 | Demirdjian et al. |
| 8,301,112 B2 | 10/2012 | Morrison |
| 8,311,560 B2 | 11/2012 | Kong |
| 8,314,683 B2 | 11/2012 | Pfeffer |
| 8,327,012 B1 | 12/2012 | Nguyen et al. |
| 8,340,904 B2 | 12/2012 | Lin |
| 2003/0134648 A1 | 7/2003 | Reed et al. |
| 2004/0049424 A1 | 3/2004 | Murray et al. |
| 2005/0131625 A1 | 6/2005 | Birger et al. |
| 2006/0059023 A1 | 3/2006 | Mashinsky |
| 2006/0206363 A1* | 9/2006 | Gove ............................ 705/6 |
| 2006/0271277 A1 | 11/2006 | Hu et al. |
| 2008/0091342 A1 | 4/2008 | Assael |
| 2008/0091480 A1* | 4/2008 | Geoghegan et al. ............... 705/5 |
| 2009/0287527 A1* | 11/2009 | Kolb et al. ........................ 705/9 |
| 2009/0319172 A1 | 12/2009 | Almeida et al. |
| 2010/0004854 A1 | 1/2010 | Shin et al. |
| 2010/0017314 A1* | 1/2010 | Johnson et al. ................. 705/30 |
| 2010/0088026 A1 | 4/2010 | Manolescu |
| 2010/0222085 A1 | 9/2010 | El Bedraoui |
| 2010/0280748 A1 | 11/2010 | Mundinger et al. |
| 2010/0280884 A1 | 11/2010 | Levine et al. |
| 2010/0299207 A1 | 11/2010 | Harley et al. |
| 2011/0028132 A1 | 2/2011 | Bos |
| 2011/0083101 A1 | 4/2011 | Sharon et al. |
| 2011/0088002 A1 | 4/2011 | Freer |
| 2011/0153629 A1* | 6/2011 | Lehmann et al. ............. 707/758 |
| 2011/0319063 A1* | 12/2011 | Nanda et al. .................. 455/416 |
| 2012/0003989 A1 | 1/2012 | Gravino |
| 2012/0083286 A1 | 4/2012 | Kim et al. |
| 2012/0109721 A1 | 5/2012 | Cebon et al. |
| 2012/0130866 A1 | 5/2012 | Cooke et al. |
| 2012/0202428 A1 | 8/2012 | Mirbaha et al. |
| 2012/0278092 A1* | 11/2012 | Pfeffer et al. .................. 705/1.1 |
| 2012/0303353 A1 | 11/2012 | Soulier |
| 2012/0303394 A1 | 11/2012 | Wanderaas |
| 2012/0329529 A1 | 12/2012 | van der Raadt |
| 2013/0024249 A1 | 1/2013 | Zohar et al. |
| 2013/0029687 A1 | 1/2013 | Cooper |
| 2013/0159027 A1* | 6/2013 | Naor et al. ......................... 705/5 |
| 2013/0238370 A1* | 9/2013 | Wiseman et al. ................... 705/5 |
| 2013/0346119 A1* | 12/2013 | LeCompte et al. ............... 705/5 |
| 2013/0346124 A1* | 12/2013 | Stern et al. ........................ 705/6 |
| 2014/0129302 A1* | 5/2014 | Amin et al. ...................... 705/13 |

FOREIGN PATENT DOCUMENTS

| | | |
|---|---|---|
| GB | 2397683 A | 7/2004 |
| WO | WO02101683 A1 | 12/2002 |
| WO | WO02103934 A1 | 12/2002 |
| WO | WO2008100489 A2 | 8/2008 |
| WO | WO2011100005 A1 | 8/2011 |

* cited by examiner

MOBILE APPLICATION USING FACILITATING DEDICATED COMMUNICATION BETWEEN SPECIFIC USERS

This application claims the benefit of provisional application 61/842,215 filed Jul. 2, 2013, the entire content of which is expressly incorporated herein by reference thereto.

FIELD OF THE INVENTION

The invention relates to a method and system for facilitating dedicated communications between specific users. More specifically, the specific users are restricted based on an associated transaction, such as a travel transaction.

BACKGROUND OF THE INVENTION

In a situation where a user has previously engaged a service entity for a service, it would be advantageous for the user to remain updated as to the status of the service. For example, if the service is a car service, the user would most likely want to know if the vehicle was running late or early. It would also be helpful if the user could quickly communicate with the driver of the vehicle that he was running late. The driver could take a longer route, go around the block, etc. It would be advantageous for the driver or user to simply make a gesture with a mobile communications device that provides a message or notification quickly to another party. The user or driver may also want to quickly communicate with the service entity to provide or receive updated information. Also, people who travel sometimes travel in groups or a group of people are associated with a particular travel transaction. For example, a travel transaction might include a driver, one or more passengers, a pilot, a booker, etc. It would be advantageous for each of these users to be able to easily and quickly communicate information between the individuals.

A system and method is needed to facilitate dedicated communication between a specific group of users relating to a travel transaction.

SUMMARY OF THE INVENTION

According to the principles of the invention, a system for facilitating dedicated communication between specific users relating to a travel transaction is provided, the system including a travel resource mobile application. The travel resource mobile application is configured to be installed on a mobile communications device and when installed associates a user of the resident application with an account in the resident application. The user of the resident application and other users are included in a group which participates in the travel transaction, and each such user is assigned a role. The travel resource mobile application is also configured to provide travel information to each user of the group of users. The travel resource mobile application is also configured to provide secure communication between the group of users, wherein the group of users is restricted based on the travel transaction. In one embodiment, the secure communication further includes chat functionality between the group of users. In another embodiment, the travel resource mobile application is further configured to retrieve user contact information from an onboard source of locally-generated content on the mobile device to facilitate communication between the group of users while masking the contact information of each user.

In one embodiment, the travel resource mobile application is further configured to determine a location of at least one user from a group of users. In another embodiment, the travel resource mobile application is further configured to determine a vehicle location of a car service of one user from a group of users. The location of the users and the vehicle may be determined in several ways. The vehicle may have a locator or a tracking device. The driver of the vehicle may also use a mobile device and the vehicle's location may be determined by the device. In one embodiment, the location of at least the user of the resident application is determined using Global Positioning Satellite (GPS) technology.

In yet another embodiment, the travel resource mobile application is further configured to estimate an arrival time based on the vehicle location and the location of the user of the resident application. In one embodiment, the travel resource mobile application is configured to provide each user the ability to indicate their location to the other users in the group. In another embodiment, the travel information is flight information associated with the user of the resident application and the user providing the flight services. In another embodiment, the transaction is a travel transaction by which each member of the group is associated. The group of users are all associated with a travel transaction and one example of an travel transaction is all of the users associated with the same flight. Another example could include all of the users booked on the flight plus a person, such as an assistant or secretary, who booked the flight. In one embodiment, the travel information includes information provided by a travel agent, airline, car service, hotel, rental car company, or a travel company. The travel information may also be any number of types of information, such as flight updates and notifications, status, receipts, alerts, etc.

In another embodiment, the group of users is an exclusive group. The group being exclusive helps prevent oversharing of information that is not relevant to users not associated with the travel transaction. Also, the exclusivity of the group of users also prevents information being distributed to users that should not have access to the information associated with the travel transaction.

Advantageously, the mobile device is a smartphone. A smart phone is a mobile phone built on a mobile operating system, with more advanced computing capability connectivity than a feature phone. Examples of smartphones are iPhone, Android, Windows, Blackberry, etc. A smartphone also has the ability to execute and display mobile applications. Further, the mobile device may be any number of devices such as an iPod, a watch, a computing device, a digital music player, a PDA, tablet computing device, etc. Also, the mobile device may include functionality to determine orientation, location, and movement of the mobile device. For example, the mobile device may include a gyroscope and/or GPS technology. It should also be appreciated that these particular functionalities may include both hardware and software components. Also, these components or the device may communicate with entities that are separate from the device. The communication may be provided over multiple different methods, such as a local network, the Internet, or Bluetooth, etc. The system may include a network of computers that communicate with the mobile application. The networked computers may include one or more servers.

Another embodiment of the invention is a method for facilitating dedicated communication between specific users relating to a travel transaction. The method includes assigning a role to each user of a group of users. The method also includes providing travel information to each user of the group of users based on each user's role. The method further includes providing secure communication between the group of users. The group of users is restricted based on the travel transaction between the users of the group. In one embodiment, the secure communication further includes chat functionality between the group of users. In another embodiment, the method further including retrieving user contact information from the mobile device to facilitate communication between the group of users while masking the contact information of each user. In one embodiment, the method further includes determining a location of at least one user from the group of users. The method also includes determining a vehicle location of a car service of another user of the group and estimating an arrival time based on the vehicle location and the at least one user's location. The arrival time may be communicated to the whole group or only to some users. The method of communication may include many different methods, such as alerts, notifications, text messages, emails, phone calls, etc. In one embodiment, the method further includes providing each user with the ability to indicate their location to the other users in the group. The indication of each user's location may also be presented to the other members of the group with various methods of communication. In another embodiment, the location of at least one user is determined using GPS technology. In one embodiment, the transaction is a travel itinerary associated with one user of the group. In another embodiment, the travel information includes information provided by a travel agent, airline, car service, rental car company, or a travel company.

BRIEF DESCRIPTION OF THE DRAWINGS

Elements of the preferred embodiments below can be mixed and matched.

DETAILED DESCRIPTION OF THE PREFERRED EMBODIMENTS

The present method and system will be described in connection with the figures, it being understood that the description and figures are for illustrative, non-limiting purposes.

Figure 1:
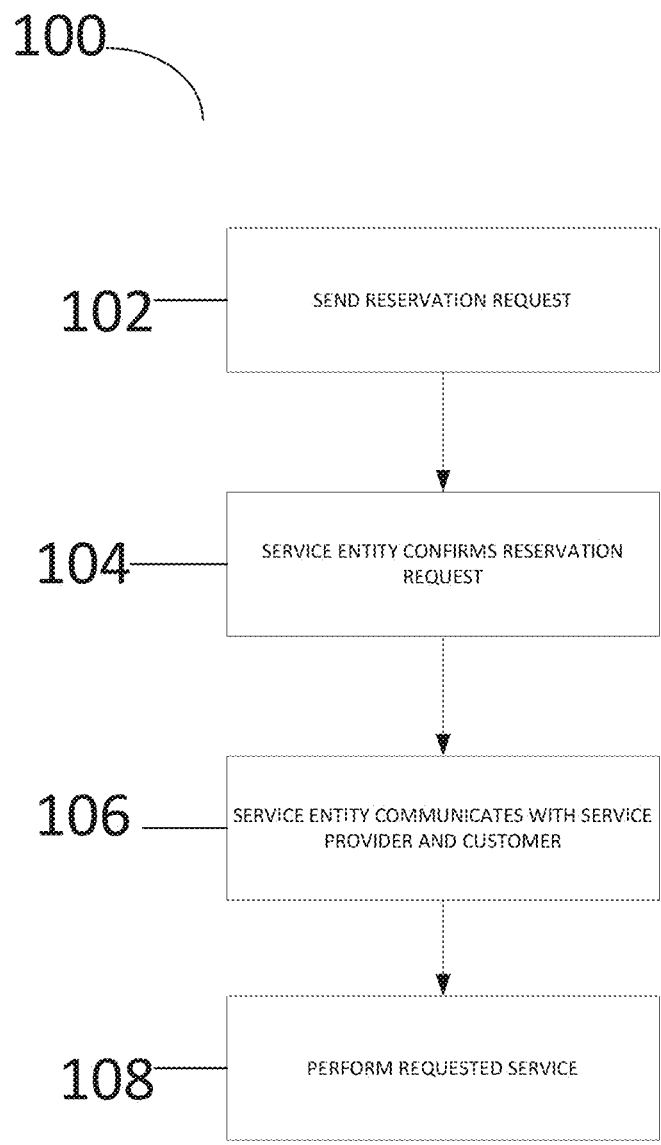
FIG. 1 is an exemplary process of the present invention.

With reference to FIG. 1, illustrated is an exemplary process 100 of the present invention. The process 100 includes sending a reservation request 102. The reservation request may be sent by any number of users, such as a booker, a passenger, or the service entity. In this example, the booker sends the reservation request 102, but the present invention is not limited to only this embodiment.

The booker is a role that is available to each user. The booker would usually be the person that initiates the request for a reservation. For example, a user may be their own booker, or a booker may be someone's personal assistant, secretary, travel agent, etc. The booker is not limited to these examples. For simplicity, a booker is simply someone who initiates the request for a reservation. The booker may request a reservation through many different methods, such as a phone call, email, fax, online registration on a website, via a mobile application, in person, etc. After the reservation request is sent, the request is received by a service entity that facilitates the service(s).

Next, the service entity confirms the reservations request 104. The service entity may be a travel service entity or any other type of service entity that facilitates and provides services to individuals. Examples of services may include various forms of arranged transportation, including chauffer, taxi and private car services (generally referred to herein as "car services"), private jets, commercial airline reservations, etc. Other types of services may also be provided. Once the request is received by the service entity, the service entity may send a confirmation to the booker. Again, the confirmation may be sent to the booker in the same manner as how the booker sent the request initially or with another method. The service entity then will facilitate the services that best fit the requirements of the request. For example, if the request was that Bill Jones needs to be picked up at LaGuardia Airport at 3:20 p.m. after landing from an American Airlines flight and transported to his home, then the service entity would find a car service or chauffer that could handle that itinerary. The car service or chauffer is then assigned to that request. In accordance with the invention, the car service may also be a van or carpool service but private car service is the preferred mode of transportation for executives or other persons requiring the least amount of lost time.

Next, the service entity would communicate with the service provider and the customer 106. The communication may be a confirmation to the booker and/or the passenger detailing the specific information about the requested pickup. Depending on the different preferences of different individuals, the passenger may also receive a confirmation of the pickup information. It also may be up to the booker to relay this information. These preferences may be set according to each user's preference. The communication may also be a confirmation to the service provider, such as the chauffeur or car service company.

Once the information has been confirmed from the service entity, each person may log into a mobile application provided by the service entity and receive updates and information through the mobile application. The mobile application may also provide methods of contacting the service entity or other relevant individuals if a situation arises.

The information within the mobile application may be displayed according to the role of each user. Each user may have a different role with each transaction. For example, the information that the booker would see when logging into the mobile application may be different than what the chauffer, passenger, or service entity would see. A passenger might see the chauffer's name, type of car, scheduled pickup time, and a point of contact (e.g., cell phone). A booker might see the confirmation from the service entity with detailed information regarding the request. The chauffer might see the passenger's name, flight number, terminal, scheduled pickup time, passenger's specific preferences, passenger's point of contact, the booker's name and point of contact, etc. The service entity may be able to see all of the above or a condensed overview of the request. These are typical but non-limiting examples of how the information relating to the service might be displayed or routed to the various entities that are participating in the booking and carrying out of the service.

Finally, the requested service is performed 108. In the above example, Bill Jones would be picked up at LaGuardia Airport at the requested time. A confirmation of the completed services may also be communicated to the service entity, booker, passenger and/or service provider. In one embodiment, the chauffeur and/or the passenger may be presented with an option within the mobile application, or other form of communication, to confirm that the passenger has been picked up. Once this confirmation is received, a notification may be sent to the relevant parties, such as the service entity and/or the booker.

As stated above, the communication between the different individuals may happen in a multitude of different ways. Any and all of the above communications and actions may be performed within the mobile application making it easier to communicate between a disparately located group of individuals associated with the specific transaction. As an alternative, some or all of the communications can be made by telephone or cell phone calls.

Figure 2:
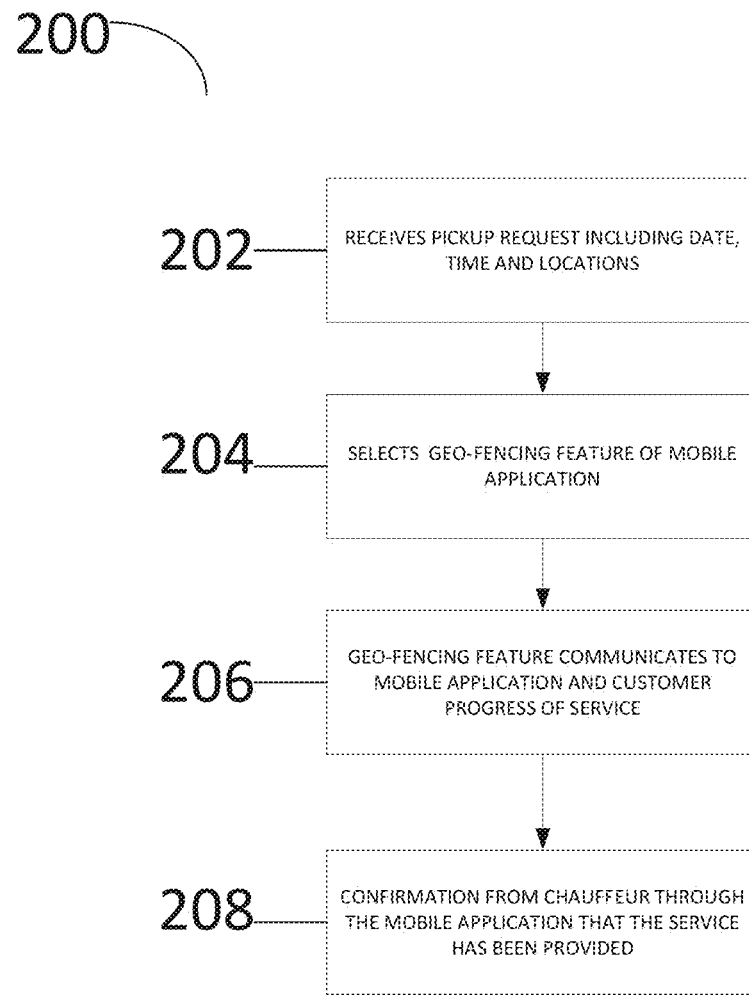
FIG. 2 is an exemplary process of the geo-fencing feature of the present invention.

With reference to FIG. 2, illustrated is an exemplary process 200 of the geofencing feature of the present invention. The geofencing feature could also be described as geo-sensing. The terms are used interchangeably. The process 200 includes receiving a pickup request including date, time and location(s) 202. The service entity would receive the pickup request and then procure a service provider to perform the pickup request. For example, the service entity would find a chauffeur or car service to perform the pickup request for Bill Jones from the above example. The chauffeur would receive the request with all of the relevant information, such as when and where to pick up Bill Jones and the destination.

The chauffeur may have the option to select the geofencing feature of the mobile application to enhance the service request 204. A passenger may also decide to select the geofencing feature. The geofencing option would provide trigger(s) to indicate to the relevant parties when certain thresholds have been crossed. An example of a trigger may be when the chauffer is within X miles of the point of pickup.

The geofencing feature communicates to the users the progress of service 206. This may communicate to the relevant parties that the chauffer is on route to pick up the passenger at the scheduled time. Another example would be when the passenger is within a certain distance (e.g. within 10 feet) of the pickup location, which would trigger a communication indicating information to the relevant parties, such as the chauffeur. The relevant parties may be the service entity, the booker, the chauffeur and the passenger. Another example of a trigger may be when the chauffeur reaches a predetermined location (e.g. within 100 feet) of the point of pickup and the trigger may cause a notification to any relevant parties, such as the booker, the passenger and the service entity.

Next, the chauffeur may provide confirmation through the mobile application that the service has been provided (e.g., the passenger has been picked up) 208. The confirmation may be communicated to the service entity and then passed on to the relevant parties or directly communicated to any relevant parties.

Figure 3:
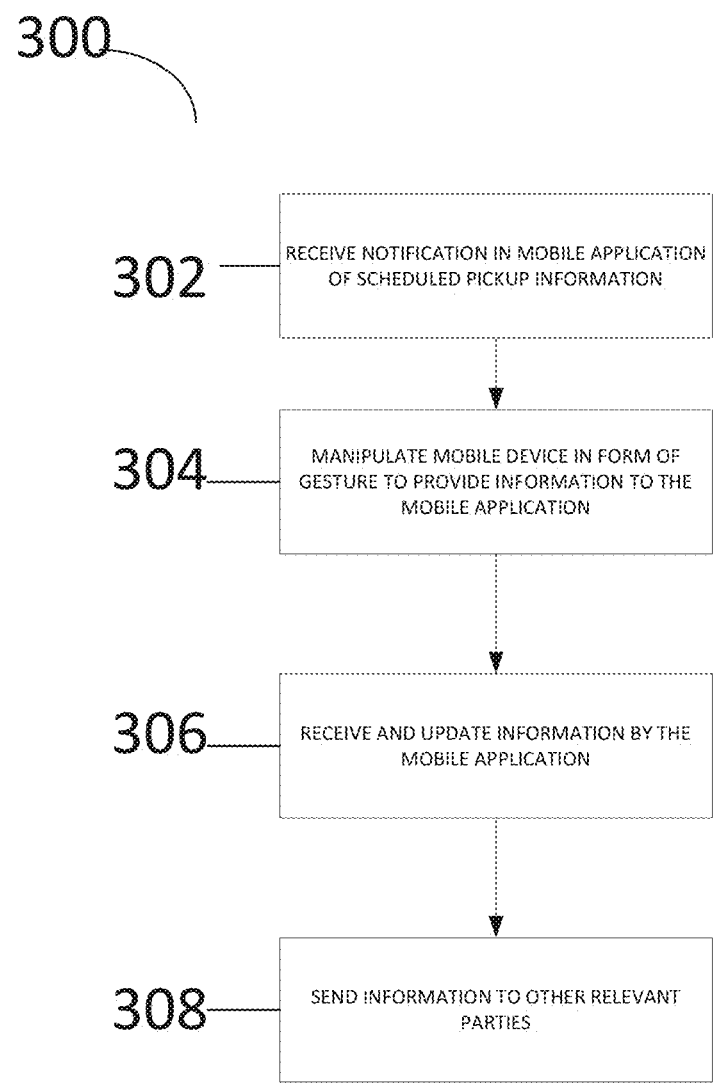
FIG. 3 is an exemplary process of the gesture manipulation feature of the present invention.

With reference to FIG. 3, illustrated is an exemplary process 300 of the gesture manipulation feature of the present invention. A notification is received in the mobile application of scheduled pickup information 302. As discussed in earlier examples, the scheduled pickup information may been requested by a booker, passenger, etc. The notification may be received by any relevant parties, such as the service entity, chauffeur, passenger, and/or booker. The scheduled pickup information may include details about the scheduled pickup, such as date, time, origination, destination, preferences, service provider information, passenger information, etc.

A manipulation of a mobile device in the form of a gesture that provides information to the mobile application 304 may be performed. By "gesture" what is meant is the manipulation of the mobile device by movement in a certain defined direction that is recognized by the mobile application as having a certain meaning to send a message. The movement cam be in a simple direction, such as back and forth linearly, rotation in a circle or ellipse, or in the formation of an alphanumeric character or shape. The information from the movement of the gesture is received by the mobile application and the mobile application is updated based on the information 306. The information is then sent or communicated to other relevant parties 308. The information may also be communicated to other relevant parties at the same time. When the information is communicated by the mobile application, other relevant parties, such as the chauffeur, may also be notified at the same time.

In a situation where the passenger cannot find the chauffeur, the passenger may manipulate his mobile device in such a way that initiates communication between the mobile device of the passenger and the mobile device of the chauffer to expose the locations of both mobile devices. This may help the chauffer and passenger locate each other. This information may also be communicated to the service entity. Also, the chauffer may manipulate the mobile device in the form of another gesture that communicates to the passenger that the chauffer had to circle the block for various reasons and will be at the pickup location soon. Another option is that the manipulation in the form of a gesture may present the passenger or chauffer (or any other user) with a list of options that may be communicated to other parties, or exposing the location of the relevant users. Also, the mobile application may provide the user with the ability to push a button to initiate any of the above options. The mobile application may communicate with the operating system of the mobile device to enable such features. The mobile application may also be able to provide these features during a locked screen of the mobile device, if necessary. The mobile application may also be able to provide these features based on the geofencing option. The mobile application may be running in the background and thus, enabled to detect motion and GPS locations, but the mobile application is not limited to only these implementations.

The manipulation in the form of gestures may be any one or more of various known or pre-arranged motions. For example, if the chauffer wants to communicate to the passenger that he is circling and will be back shortly, the chauffer may make a circular motion with his mobile device. The mobile device includes sufficient hardware and software technology to provide the detection of the different gestures, such as a gyroscope and GPS. Another example of the gesture may be shaking the device to indicate to expose the locations between the relevant parties. Other examples include making distinct letters with the phone to indicate particular communications, such as 'D' for delay, 'C' for circling, 'R' for ready, etc. It should be appreciated that these are just examples and the present invention is not limited to these and only these examples.

In the situation that the passenger's flight has been delayed (or for other reason the passenger has been delayed) for a certain amount of time, the delay may be communicated to the relevant parties to coordinate any necessary changes. For example, the chauffer, booker, and/or service entity may receive relevant updates about the flight (or meeting, etc.) of the passenger. In the situation that the passenger is late, at least the chauffer would be informed and would plan the pickup accordingly. The updated pickup information may be communicated to all the relevant parties to inform them of the changes in the itinerary. This is helpful in the situation that the passenger is being picked up from one location and has another time-sensitive situation at the destination. For example, the passenger is picked up at the airport and has a meeting shortly afterwards at another location. The booker or passenger might receive the notification of the change in pickup time and communicate that change to the relevant person for the meeting.

Another example is a situation where the request from the booker includes a private flight and a chauffer request. Another user role is included in the communication between the relevant parties and this would be the pilot and/or flight staff. There would be at least one more defined role for the users associated with the transaction. In this example, a booker may request a reservation for a car pickup, as well as, a private flight to a destination. Again, the service entity would confirm the reservation with the car service or chauffer for an appropriate pickup time. The service entity would also confirm a private flight schedule with a pilot or private jet service that coincides with the passenger's needs. Once both the services are confirmed, the relevant parties are informed of the confirmation details of each service. For example, the booker may receive the flight schedule and pickup time and any other relevant details, such as chauffer's name, car type, pick up location, pilot's name, plane type and amenities, etc. The system may also send the relevant information to the passenger or the booker may provide the passenger with the details. The relevant information may be made available to each user associated with the transaction via the mobile application. When a user signs into the mobile application and it is determined the role associated with the user for this transaction, the information relevant to that user is available. For example, the information available to the chauffer may be different than the information available to the passenger, pilot, booker, service entity, etc.

In one situation, the passenger may be running 30 minutes late. The information that the passenger is running late may be communicated in multiple different ways. For example, the passenger could inform the booker who could then inform the service entity, chauffer, pilot, etc. The passenger could also use the mobile application to let all necessary parties know the latest information. The passenger could also only notify the service entity or the chauffer. Those parties could then pass the information on to anyone who needs the information. Also, the mobile application may include the geofence feature. The mobile application may periodically check the location of the mobile device based on a saved itinerary of the transaction. For example, if the scheduled pickup time was 9:00 AM at Grand Central Station, the geofence feature could determine if the passenger's mobile device is located at Grand Central a threshold of time prior to the scheduled pickup time. The threshold can be various amounts of time, such as five, ten, fifteen, twenty minutes, etc. If the passenger's mobile device is not located at the pickup time within a threshold, the mobile application may ask the passenger if he would like to adjust the scheduled pickup time. If the passenger selects this option, the relevant parties would be notified of the change in pickup time. For example, the chauffeur and the pilot would need to know the updated pickup time. This situation could also work in reverse. For example, if the pilot was experiencing delays and was not at the location at the scheduled time, either the geofence feature of the mobile application or the pilot himself could notify the relevant parties of the delay. The notifications may occur within the mobile application, through email, text message, and/or phone calls. The up-to-date notification within the mobile application allows any of the relevant parties to receive notifications. For example, the booker may need to keep tabs on the passenger to schedule other meetings and be aware of when the passenger is available. Or if there are issues with flights and/or schedules, the booker would most likely be aware of any issues and already working on fixing any issues before the passenger would have time to inform the booker what is going on. Also, the service entity would most likely be aware of any delays or issues, as well.

Once a passenger pickup has been completed by the chauffer and the chauffer is on the way to the airport, the chauffer may also want to inform the pilot that the passenger is on route to the airport. This may be helpful to the pilot so that he can start preparing to take off as soon as the passenger is on board.

The situations described above are merely examples. It should be appreciated that other situations may also be described. For example, a passenger needs to be taken to the airport for a commercial flight (or other location). The coordination of a commercial airline ticket may also be considered. For example, the updates of flight status may also be communicated between the relevant parties.

Figure 4:
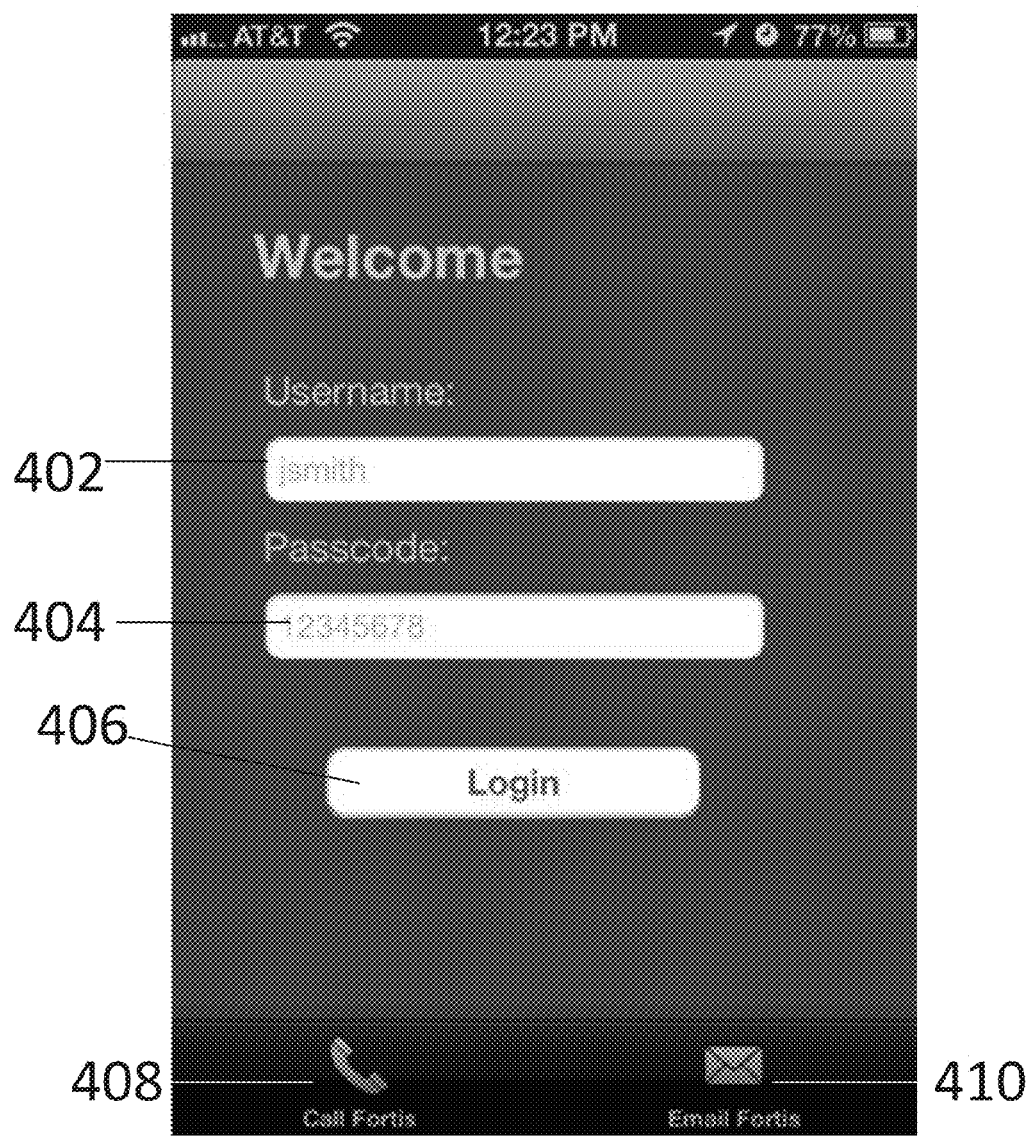
FIG. 4 is an exemplary screenshot of a login screen of the mobile application.

Now with reference to FIG. 4, illustrated is an exemplary screenshot of a login screen 400 of the mobile application. The login screen 400 may include a username field 402, a passcode field 404, a login button 406, a call Fortis button 408, and an email Fortis button 410. The username field 402 may be an assigned or selected username for any user of the mobile application. The user may request a username on a website, through email, over the phone, in the mobile application, etc. The username uniquely identifies a user of the mobile application or service and may be any number of characters, numbers, etc. The passcode field 404 may also be assigned or selected to the user to match up with the username. The passcode field 404 may be numbers, letters, characters, etc. The login button 406 is selected once the user has input the username and passcode into the appropriate fields. The call Fortis button 408 is an option that provides the user of the mobile application a direct link to call the service entity. The email Fortis button 410 is an option that provides the user of the mobile application a direct link to send an email to the service entity. For example, either of these options might be useful if the user is having a hard time logging in, forgot the username, passcode, etc.

Figure 5:
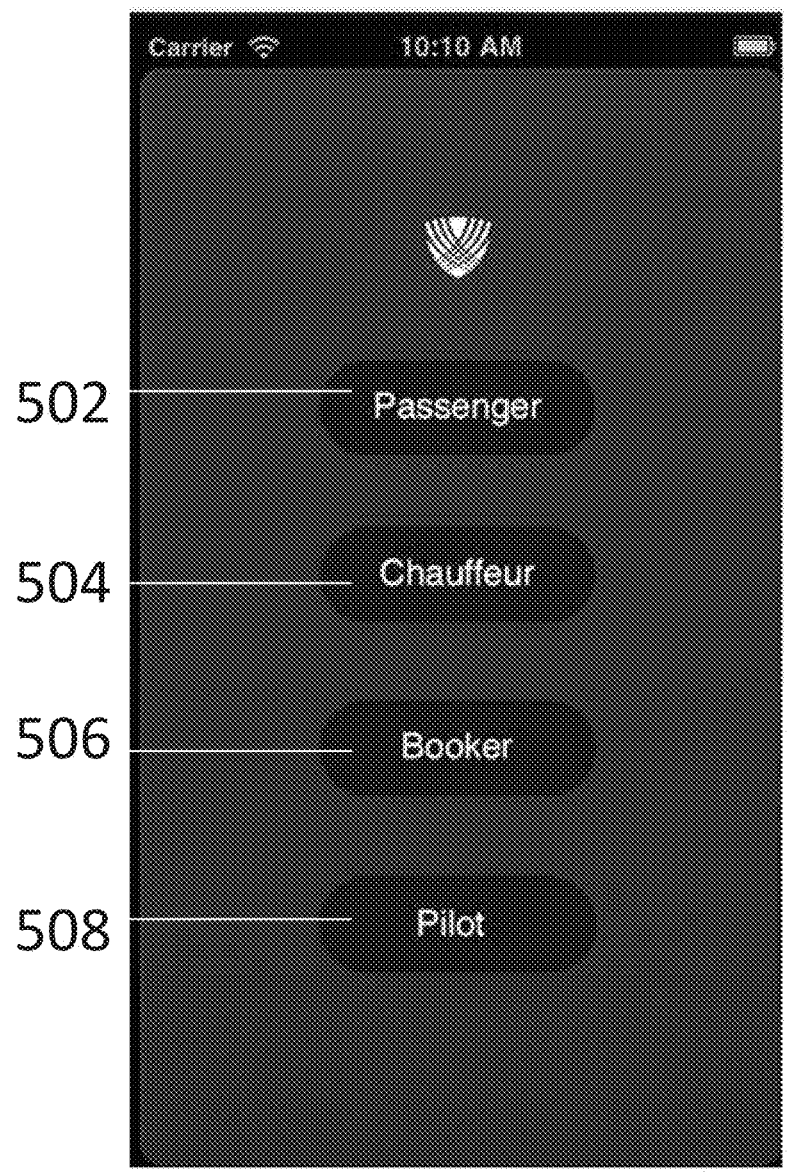
FIG. 5 is an exemplary screenshot of a role selection screen in the mobile application.

Now with reference to FIG. 5, illustrated is an exemplary screenshot of a role selection screen 500 in the mobile application. The role selection screen 500 may be after the login screen 400 or before. For example, if the user is a new user, the role selection screen 500 may be before the login screen 400. The role selection screen 500 may also appear every time the user is in the mobile application. This may be useful to a user that changes roles. It also may be provided that a particular user may opt out of seeing this screen after an initial time because the user never changes roles.

The role selection screen may include the role sections of passenger 502, chauffeur 504, booker 506 and pilot 508. The present invention is not limited to only these roles. The passenger role selection 502 might direct the user to the screen of FIG. 6. The chauffeur role selection 504 might direct the user to the screen of FIG. 10. The booker role selection 506 might direct the user to the screen of FIG. 12. The pilot role selection 508 might direct the user to the screen of FIG. 14.

Figure 6:
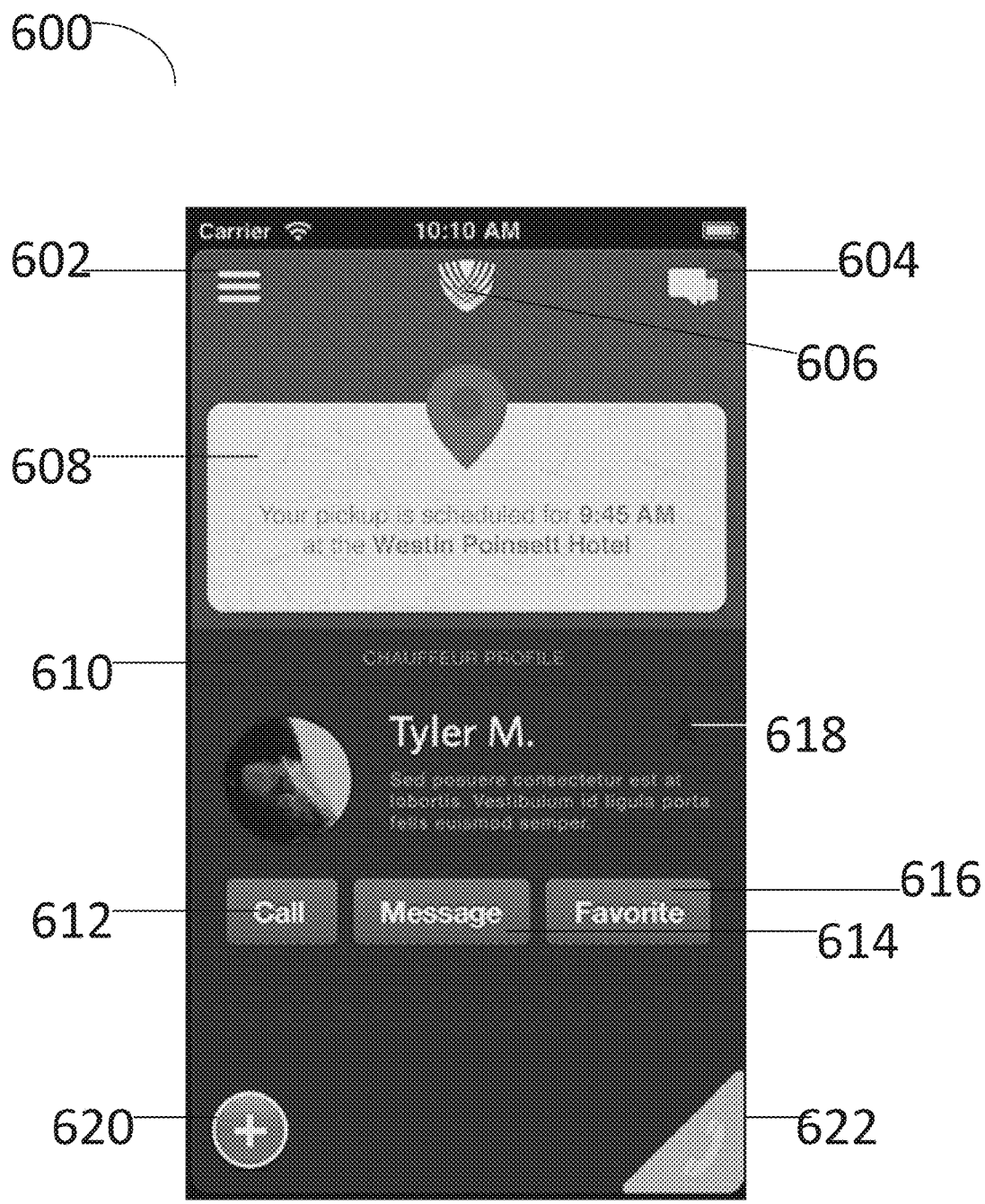
FIG. 6 is an exemplary screenshot of a passenger information screen in the mobile application.

Now with reference to FIG. 6, illustrated is an exemplary screenshot of a passenger information screen 600 in the mobile application. Screen 600 is an example of what a user might see when the passenger role selection 502 of FIG. 5 is selected or if the default role for the user is set to passenger. A user may receive a notification from the mobile application and screen 600 may also then be presented to the user. Screen 600 may include a profile button 602, a message center button 604, a home button 606, itinerary section 608, chauffeur profile 610, call chauffeur button 612, message chauffeur button 614, favorite chauffeur button 616, a favorite indicator 618, a menu button 620 and a call Fortis button 622.

The profile button 602 may present the user with his own profile information and preferences. The selection of the profile button 602 may direct the user to the screen of FIG. 7. The message center button 604 may provide the user with access to the message center, where the user can send messages to any relevant parties associated with the current transaction, itinerary or service. The selection of the message center button 604 may direct the user to the screen of FIG. 8.

The home button 606 may provide many different functionalities. It may direct the user to a home screen or main screen, screen 500 of FIG. 5, screen 400 of FIG. 4 or some other screen. The itinerary section 608 may present the user with information about his upcoming service. In this example itinerary section 608 displays, "Your pickup is scheduled for 9:45 AM at the Westin Poinsett Hotel." This is information pertaining to one transaction, itinerary or service. The itinerary section 608 may provide information about one or more itineraries or transactions. The mobile application may provide the functionality to select the itinerary section 608, which may direct the user to the screen of FIG. 9. The itinerary section 608 may provide important information regarding the upcoming service. The information may be very broad or more specific and detailed.

The chauffeur profile 610 may provide information for the passenger about the chauffeur that is providing the service mentioned in itinerary section 608. The chauffeur profile 610 may include a name, a picture, an about section, a call button 612, a message button 614, a favorite button 616, and a favorite indicator 618. Other information may also be provided. The chauffeur may provide the information in the chauffeur profile 610 or it may be provided by the service entity. The about section may include fun facts or information about the chauffeur. The call button 612 may provide the passenger (or other user) with the ability to call the chauffeur directly. The call button 612 may also mask the phone number of the chauffeur to protect the chauffeur's privacy. Therefore, the passenger (or other user) might not be able to directly contact the chauffeur after the transaction has transpired.

The message button 614 may provide the passenger (or other user) with the ability to send the chauffeur a message. Selecting the message button 614 may send a text message, email message, etc. directly to the chauffeur or it may direct the user to the message center, similar to the message center button 604. The message button 614 may also mask the phone number, email address, etc., for privacy reasons. The favorite button 616 may allow the passenger (or other user) the ability to label a particular chauffeur as a favorite. This may indicate that the passenger (or other user) would prefer this chauffeur to other ones in future bookings. The favorite indicator 618 may display a shape, such as a star, that indicates that this chauffeur has been labeled as a favorite for this user. For example, if the favorite indicator 618 is filled in, it could indicate that the chauffeur has been labeled as a favorite and if the favorite indicator 618 is not filled in, the chauffeur has not been labeled as a favorite. The favorite button 616 may act as a toggle switch for the favorite indicator 618.

The menu button 620 may present the user with a customized menu of action items that the user can perform. For instance, for the passenger the selections might be book new transaction, my profile, record voice memo, and digital sign. After the selection of the menu button 620 and the menu appears, the menu button 620 might change into an X to close the menu. The menu button 620 may also provide the user the ability to add information to any portion of screen 600. For example, if the user needs to make a change to the itinerary by changing the time, adding a destination, etc. The menu button 620 may also provide the functionality to add another transaction, service or itinerary for that user. The call Fortis button 622 may be the same as described above with respect to screen 600 of FIG. 6. This might be useful if a problem arises with the itinerary, service, etc.

Figure 7:
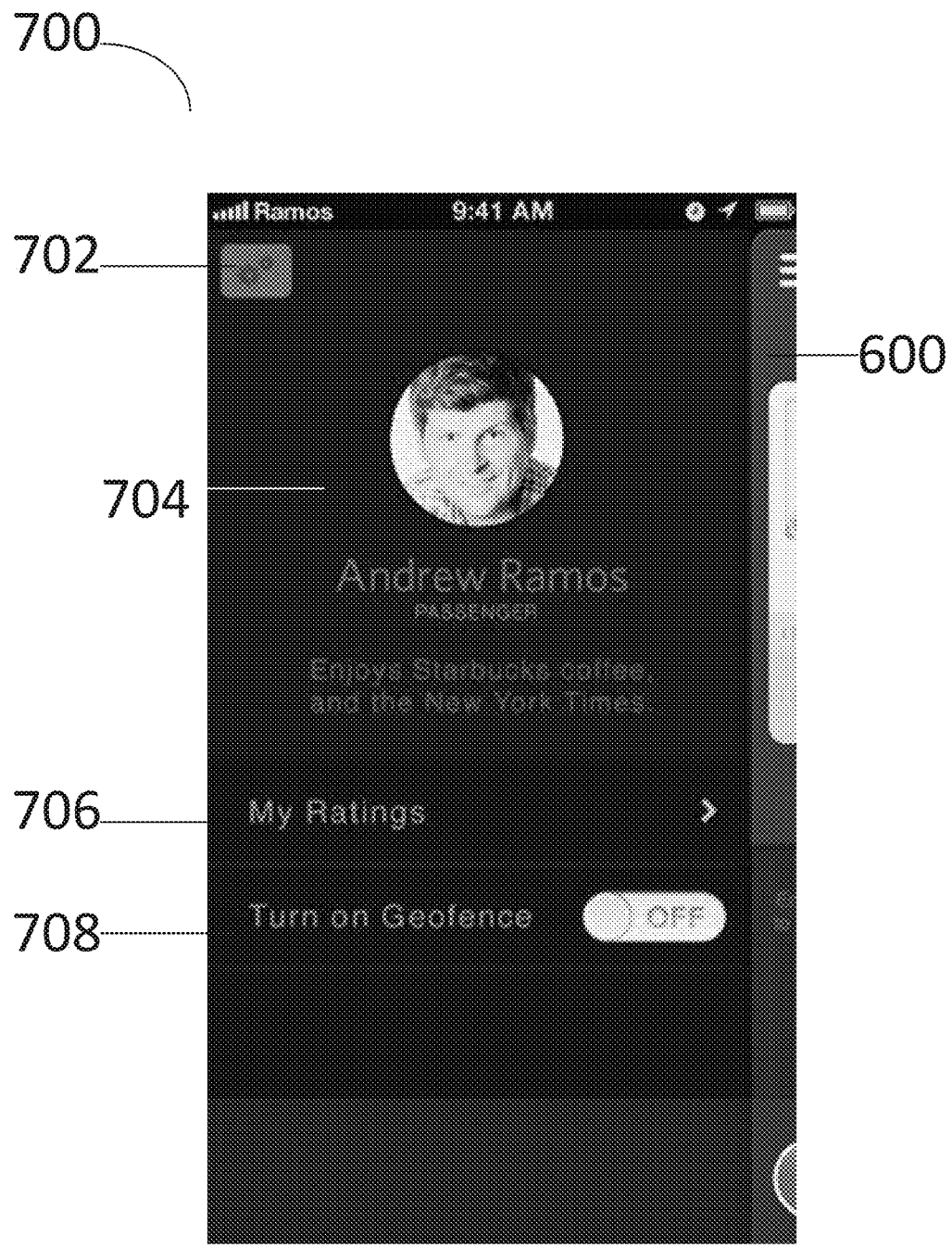
FIG. 7 is an exemplary screenshot of a passenger profile screen in the mobile application.

Now with reference to FIG. 7, illustrated is an exemplary screenshot of a passenger profile screen 700 in the mobile application. The passenger profile screen 700 may be visible to any user who wishes to view information about the passenger(s) of a transaction. The passenger profile screen 700 may include a settings button 702, a profile section 704, a ratings section 706, a geofence option 708, and a small glimpse of the previously displayed screen, which in this example is screen 600.

The settings button 702 may provide the user with the ability to make changes to their own profile, such as the picture, the about section, privacy settings, etc. The profile section 704 may include the name, picture and other relevant information about the passenger. The profile section 704 may also include information that is relevant to the chauffer or pilot, if the chauffeur or pilot wanted to be prepared for the transaction ahead of time. The passenger information may include something like, "Enjoys Starbucks coffee, and the New York Times." Therefore, the chauffeur or pilot may want to make sure that one or both of the car ride or plane ride includes Starbucks coffee and the latest edition of the New York Times.

The ratings section 706 may present the user with another screen that lists information about ratings about past and future ratings. The rating section 706 may also present the passenger with a screen that gives the passenger the ability to rate other users of a transaction. For example, if a passenger has a particularly positive experience with a chauffeur or pilot, the passenger may indicate that in the ratings section 706 of his profile. Other user's may be notified of ratings pertaining to them or they may be kept private so that only the service entity has access to the ratings. For example, chauffeurs may be rated from 1-5 on every half point. Each level tells them how well they are doing in the service entity's estimation. For example, a 5 is a chauffeur that represents the service entity well by anticipating unspoken needs of the passenger and welcoming challenging situations with a good attitude.

The geofence option 708 or also the geo-sensing option may provide the passenger the option of turning the geofence on to provide an extra layer of communication to the other users of a transaction based on the sensed location of the mobile device of the passenger. For example, if the geofence option is turned on, it may determine that the passenger is close to the destination at the scheduled time. The geofence option is discussed in more detail above. Screen 700 also may include a partially visible portion of screen 600. This may enable the user to quickly switch between the screens of 600 and 700.

Figure 8:
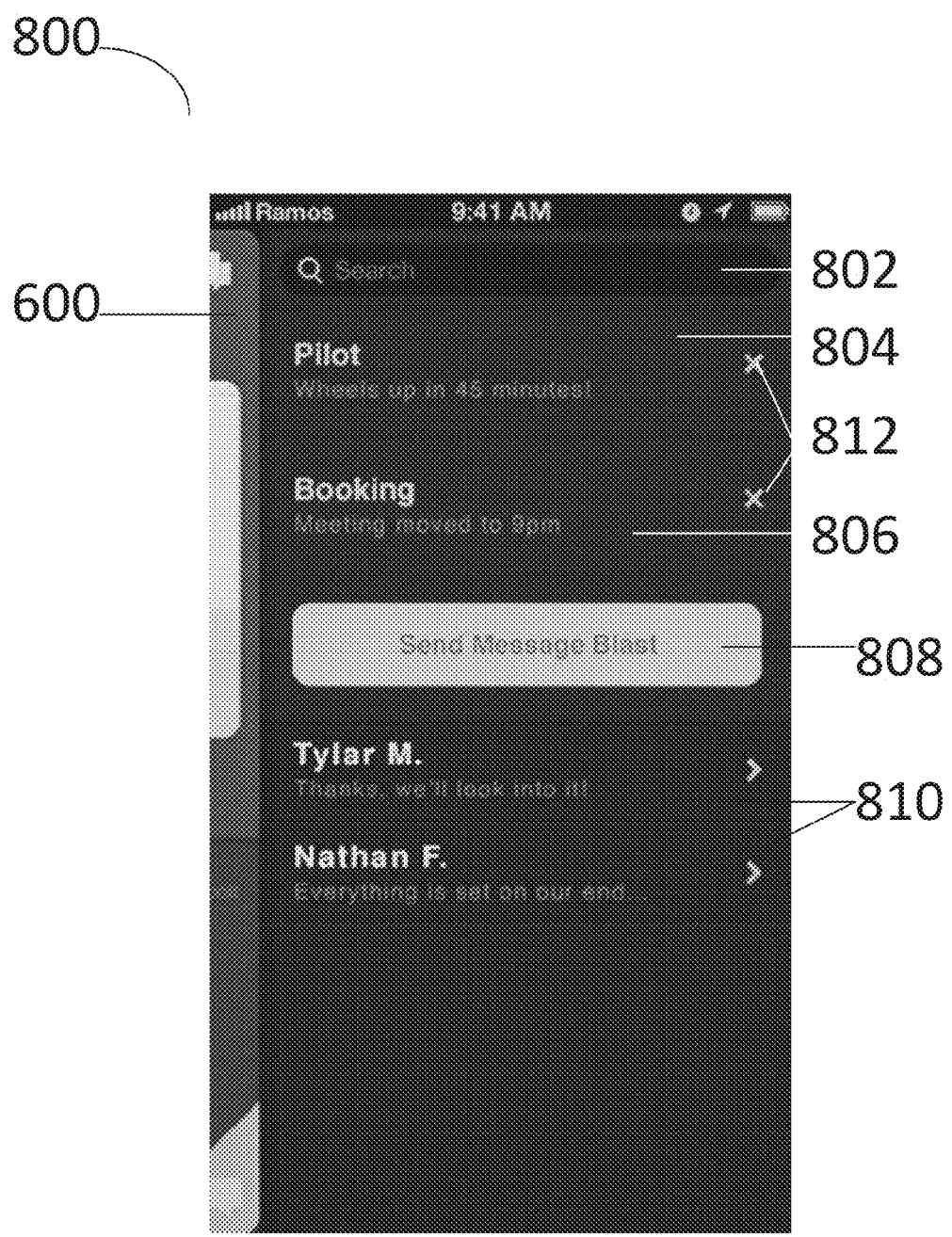
FIG. 8 is an exemplary screenshot of a message center screen for a transaction in the mobile application.

Now with reference to FIG. 8, illustrated is an exemplary screenshot of a message center screen 800 for a transaction in the mobile application. The message center screen 800 may be presented to the user after the user selects the message center button 604 of FIGS. 6, 10, 12, 13 and 14. The message center screen 800 may also be presented to the user after the user selects the message button 614 of FIG. 6. The message center screen 800 may include a search field 802, a pilot message 804, a booking message 806, a send message blast button 808, messages 810, and close messages indicator 812. Screen 800 may also include a partially visible portion of screen 600. This may enable the user to quickly toggle between screens 600 and 800. Messages are capable of being sent to one or more of the communication loop or relevant parties. A user can send a message to one, two, or all of the users associated with a transaction. It might be important for a chauffeur to only communicate with the service entity at least initially but the invention is not limited to that.

The search field 802 may provide the user the ability to search for keywords of all of the messages in the message center or the search field 802 may also provide the user the ability to search the entire mobile application using keywords. The pilot message 804 may be sent to only one user, a select group of users, or all of the users associated with the transaction. This particular message from the pilot is letting the relevant parties know that the plane will be taking off in 45 minutes. This type of message from a pilot would most likely be sent in the situation where there is a private plane and pilot included in the transaction.

The booking message 806 may include messages directly from the booker to the user of the mobile application. The messages in the booking message 806 may be information that only the passenger needs to know, such as meeting information, hotel information, etc. The send message blast button 808 may easily provide a method to send a quick hello message to each user associated with the transaction. For example, there might be more than one passenger associated with a transaction and one member of the party would like to welcome the group to the transaction or inform the entire group of changes to the itinerary. Also, it might be good to send a welcome message in this format to let the other users know that this form of communication is available to them. The send message blast button 808 may send individual messages or a group message, there might also be an option to select between the two options.

The messages 810 may be private communications between two users or a select group of users. A group message may also be available in the same manner as individual messages. The messages 810 may operate similar to text messages or any other form of instant communication, such as instant messenger messages. As shown in screen 800, the messages 810 may display the last received or sent message. The mobile application may also allow the user to select one of the messages and the user may be presented with another screen that displays the entire conversation relating to that message.

The pilot message and the booking message also may include close messages indicators 812. The close messages indicators 812 may provide the user the ability to remove or close the option from view. The mobile application may also provide the functionality that even if the message has been closed that when a new message is sent, all previous communication associated with the transaction is still displayed.

Figure 9:
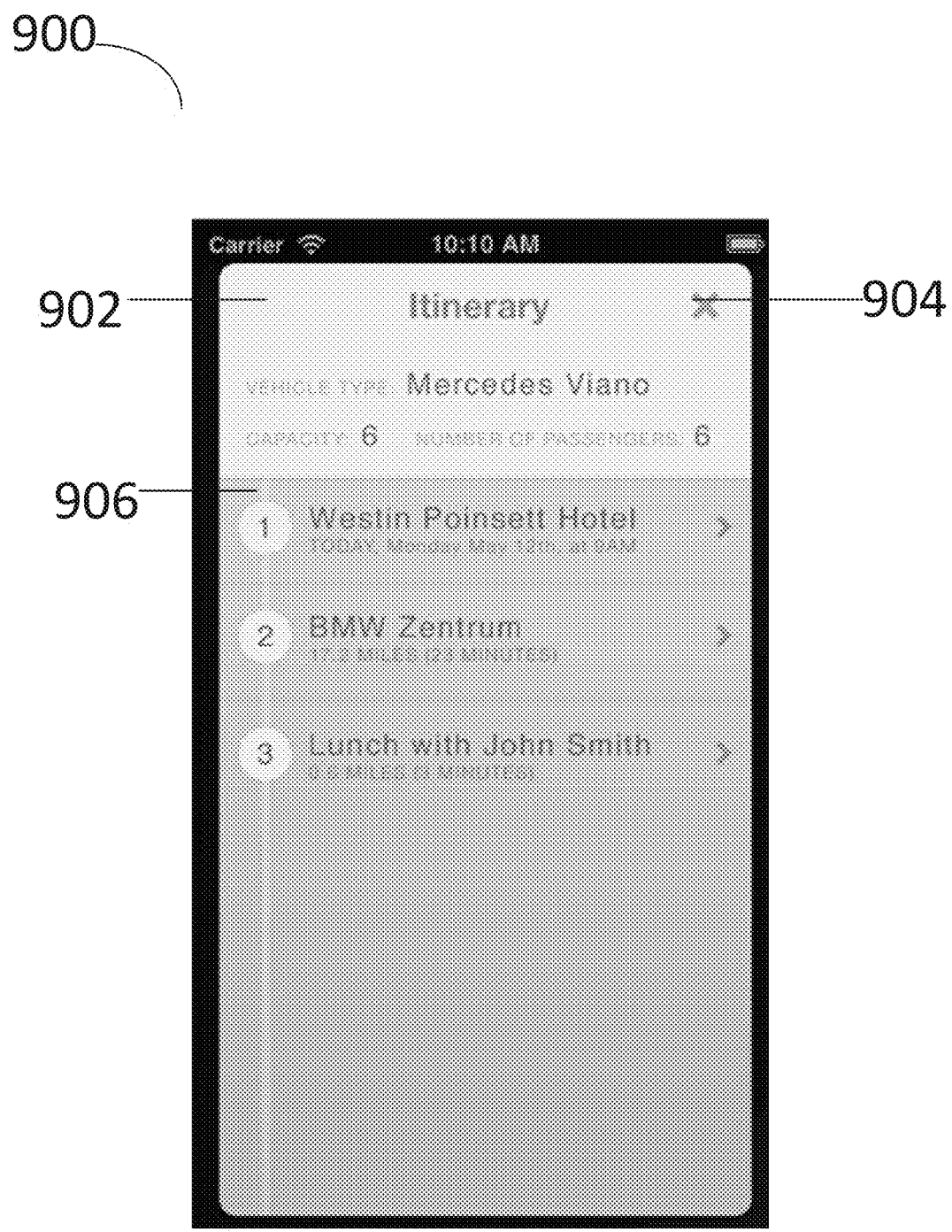
FIG. 9 is an exemplary screenshot of an itinerary screen for a transaction in the mobile application.

Now with reference to FIG. 9, illustrated is an exemplary screenshot of an itinerary screen 900 for a transaction in the mobile application. The itinerary screen 900 may include an itinerary 902, a close window indicator 904 and a list of items 906 on the itinerary. The itinerary 902 may include information, such as the make and model of car the chauffeur is driving, the capacity of the type of car and the number of scheduled passengers. When the close window indicator 904 is selected, the itinerary screen 900 may be replaced by the previously displayed screen, screen 600 of FIG. 6, or some other screen.

The list of items 906 on the itinerary may include the items that are relevant to all the passengers or only one particular passenger. The list of items 906 may also only include the items that the chauffeur and/or pilot are needed for or the list of items 906 may also include other items relevant to the transaction as well. In this example, the list of items 906 includes a meeting at the Westin Poinsett Hotel, Monday, May 12 s at 9 AM; another meeting at BMW Zentrum which is 17.2 miles (around 23 minutes) from the Westin Poinsett Hotel; and a lunch meeting with John Smith, which is about 0.6 miles from the BMW Zentrum. Any of these items on the list of items 906 may be selected and the user may presented with another screen that tells more information about the item, shows a map of the location of the item, etc.

Figure 10:
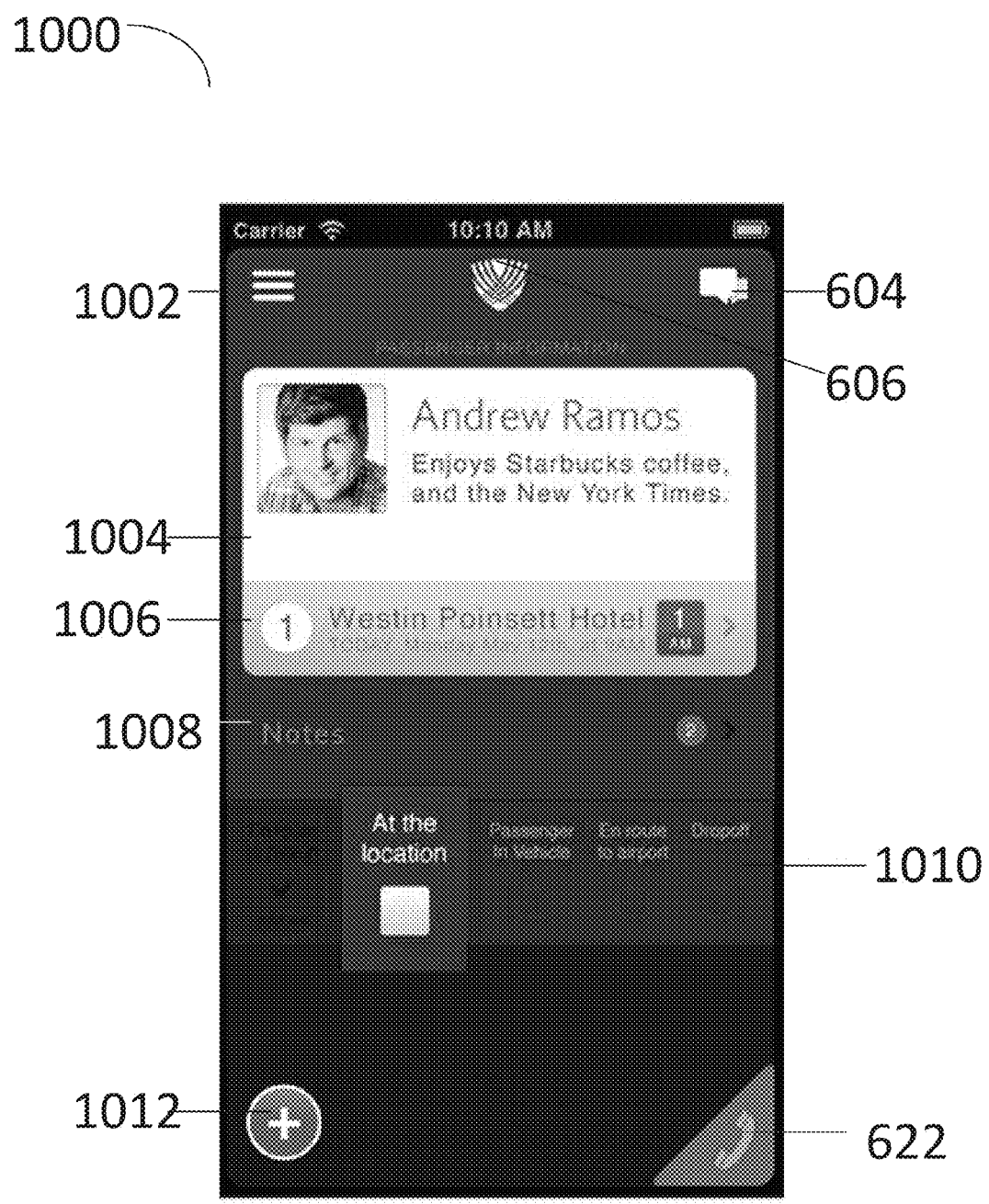
FIG. 10 is an exemplary screenshot of a chauffeur information screen in the mobile application.

Now with reference to FIG. 10, illustrated is an exemplary screenshot of a chauffeur information screen 1000 in the mobile application. Screen 1000 may be presented to a user or a chauffeur after the role selection of chauffeur 504 of FIG. 5. Screen 1000 may include a profile button 1002, the message center button 604, home button 606, passenger profile 1004, pickup details 1006, notes 1008, progress indicator 1010, a menu button 1012, and call Fortis button 622.

The selection of the profile button 1002 may direct the user to the screen of FIG. 11, which is discussed in more detail below but may include profile information about the chauffeur. The selection of the message center button 604 may direct the user to screen 800 of FIG. 8. The selection of the home button 606 may direct the user to screen 500 of FIG. 5, a main menu or some other screen. The passenger profile 1004 may provide the chauffeur with necessary or helpful information to carry out the service. The information contained within the passenger profile may be provided by the information stored in the passenger profile of FIG. 7. The information may include the passenger's name, a picture and maybe some preferences.

The pickup details 1006 may include detailed information for the chauffeur to perform the service. In the shown example, the pickup details are the Westin Poinsett Hotel on Monday, May 12 at 9 AM. The mobile application may provide for the pickup details 1006 to be selectable. The selection of the pickup details 1006 may direct the user to the itinerary of screen 900 of FIG. 9. The pickup details 1006 of screen 1000 may only show the initial pickup information and the entire itinerary may include multiple destinations.

Notes 1008 may provide the chauffeur or other user the ability to write notes that may be helpful in future transactions or just an easy place to write important notes. Notes 1008 may also have an indicator showing the number of notes stored for this particular transaction, passenger, etc. The selection of notes 1008 may also direct the user to a different screen.

The progress indicator 1010 may provide the chauffeur an easy way to update the mobile application with the progress of the service. By updating the mobile application, the service entity and any other relevant parties may be updated quickly and easily. In the illustrated example, the progress indicator 1010 enlarges the next step in the transaction and includes a checkbox for marking the item for completion. Once the item is marked for completion, the next item would be enlarged and the completed item may return to the size of the other items. This is just one illustration of how the progress indicator may function or be displayed. The progress indicator could also be a list. Examples of the items are at the location, passenger in vehicle, en route to airport, drop off. Depending on the type of service, each progress indicator may be different.

The menu button 1012 may present the user with a customized menu of action items that the user can perform. For instance, for the chauffer the selections might be book new vehicle, my profile, record voice memo, and digital sign. After the selection of the menu button 1012 and the menu appears, the menu button 1012 might change into an X to close the menu. The call Fortis button 622 may be the same as described above with respect to screen 600 of FIG. 6.

Figure 11:
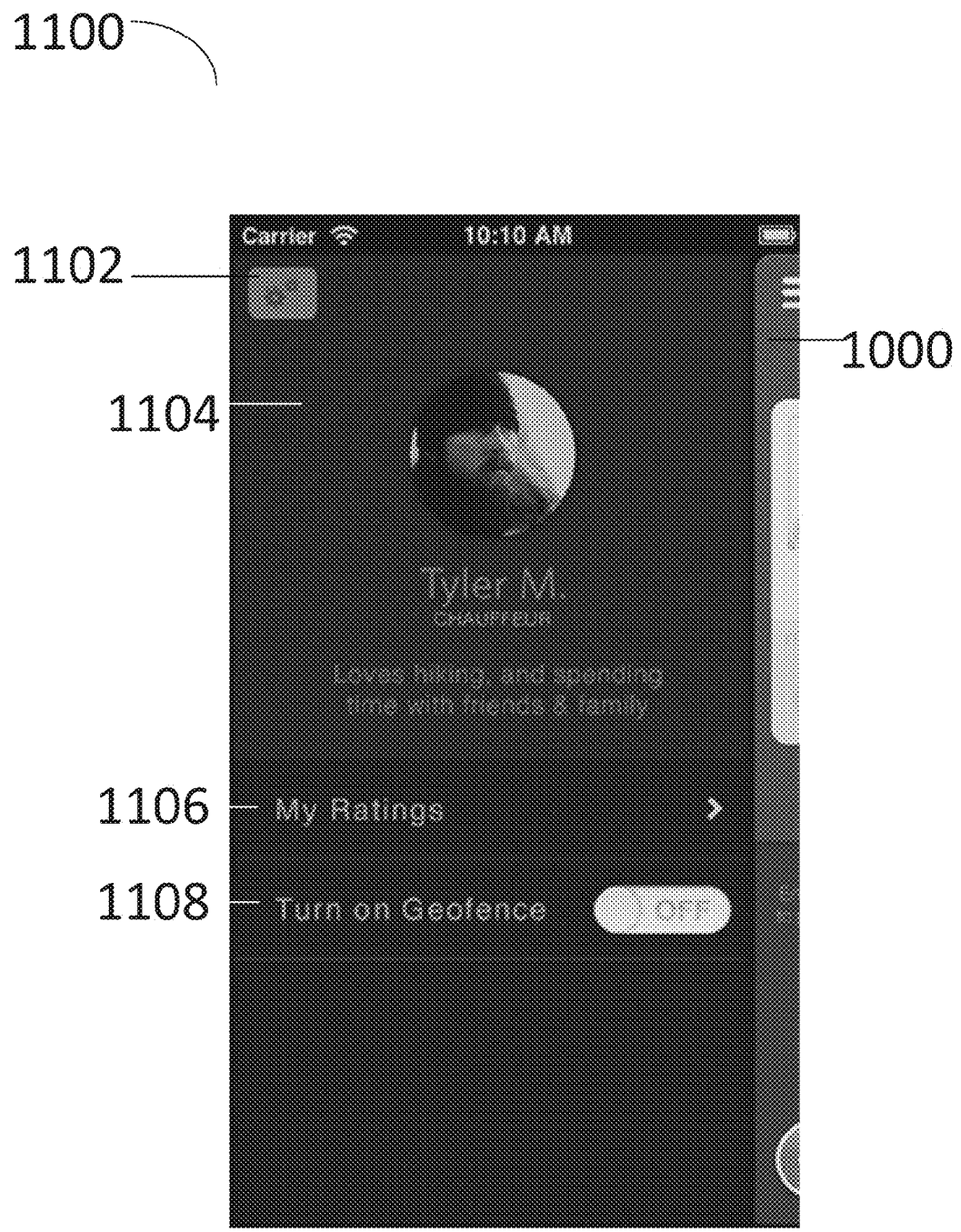
FIG. 11 is an exemplary screenshot of a chauffeur profile screen in the mobile application.

Now with reference to FIG. 11, illustrated is an exemplary screenshot of a chauffeur profile screen 1100 in the mobile application. Screen 1100 may be presented to a user after the selection of the profile button 1002 of FIG. 10. Screen 1100 may provide the chauffeur with profile information for himself. Screen 1100 may include a settings button 1102, profile information 1104, ratings section 1106, and geofence option 1108. Screen 1100 may also include a partially visible portion of screen 1000. This may enable the user to easily switch between screens 1000 and 1100.

The settings button 1102 may provide the user with the ability to make changes to their own profile, such as the picture, the about section, privacy settings, etc. The profile section 1104 may include the name, picture and other relevant information about the chauffeur. The profile section 1104 may also include information that is relevant to the relevant parties, if they wanted to be prepared for the transaction ahead of time. The chauffeur information may include hobbies or other general information, such as "Loves hiking, and spending time with friends & family." It might be easier for the passenger to have a conversation with the chauffeur if he knows some information about the chauffeur.

The ratings section 1106 may present the user with another screen that lists information about ratings about past and future ratings. The rating section 1106 may also present the chauffeur with a screen that gives the chauffeur the ability to rate other users of a transaction. For example, if a chauffeur has a particularly positive experience with a passenger or pilot, the chauffeur may indicate that in the ratings section 1106 of his profile. Other user's may be notified of ratings pertaining to them or they may be kept private so that only the service entity has access to the ratings. The chauffeur may also be able to view ratings about himself.

The geofence option 1108 or also the geo-sensing option may provide the chauffeur the option of turning the geofence on to provide an extra layer of communication to the other users of a transaction based on the sensed location of the mobile device of the chauffeur. For example, if the geofence option is turned on, it may determine that the chauffeur is on route to the scheduled destination and time. The geofence option is discussed in more detail above.

Figure 12:
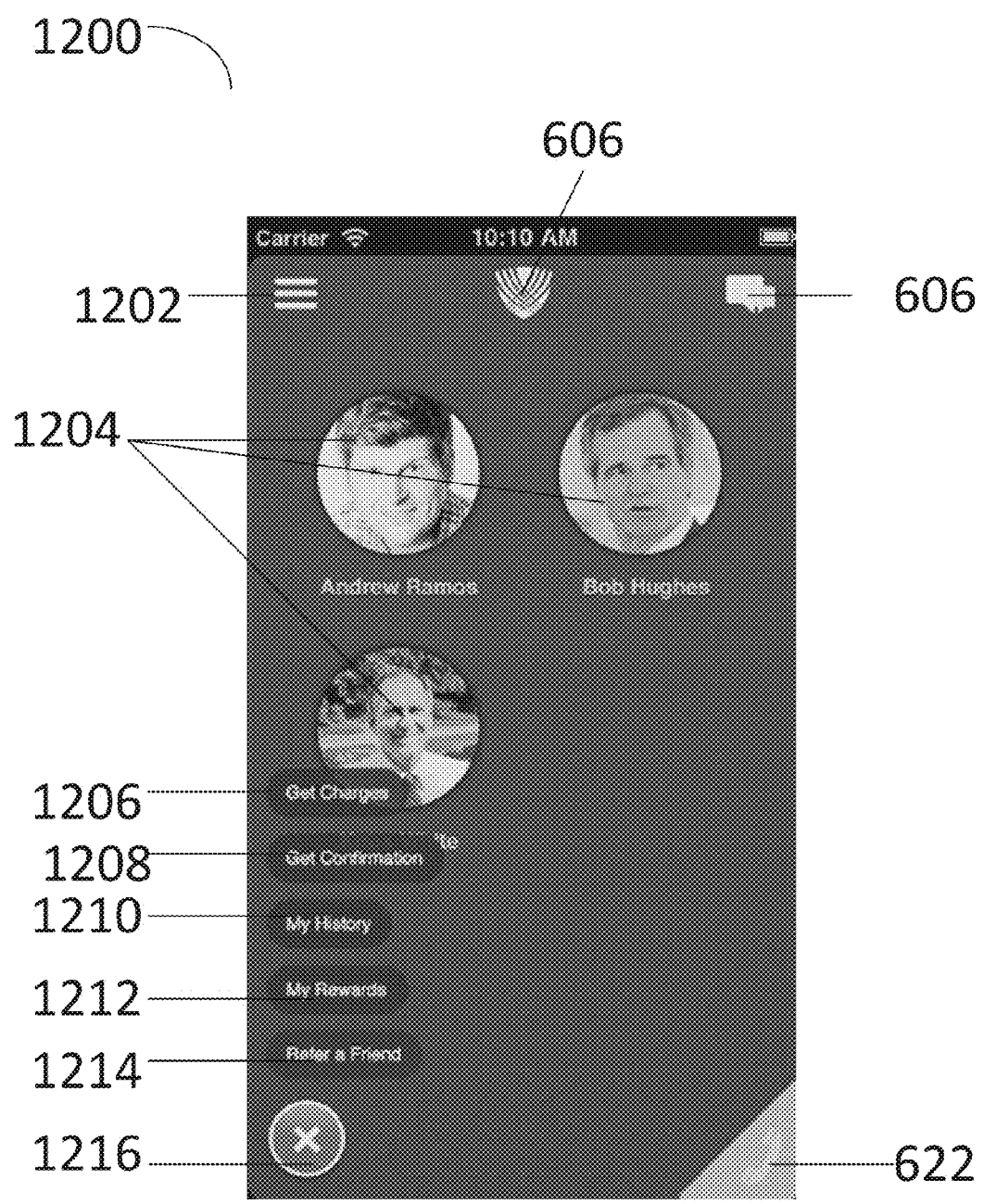
FIG. 12 is an exemplary screenshot of a home screen for the booker in the mobile application.

Now with reference to FIG. 12, illustrated is an exemplary screenshot of a home screen 1200 for the booker in the mobile application. Screen 1200 may be displayed after the role selection of booker 506 of FIG. 5. Screen 1200 may include a profile button 1202, the message center button 604, the home button 606, passengers 1204, get charges option 1206, get confirmation option 1208, my history option 1210, my rewards option 1212, refer a friend option 1214, menu button 1216, and the call Fortis button 622.

The selection of the profile button 1202 may direct the user to a screen that displays information about the booker. The screen may look similar to screen 700 of FIG. 7 and screen 1100 of FIG. 11. The message center button 604 may direct the user to screen 800 of FIG. 8 when selected. The home button 606 may direct the user to screen 500 of FIG. 5, a main menu or some other screen.

The passengers 1204 may include one or more passengers that the user or the booker has booked transactions for. Each of the passengers 1204 may be selectable. The selection of one of the passengers 1204 may direct the user to information about an upcoming transaction associated with that passenger, profile information, etc. Examples of the screens that the user may be presented with include FIG. 13 and screen 700 of FIG. 7.

The options at the bottom of screen 1200 may be expanded from menu button 1216. The menu button 1216 may look like a plus sign or any object and when selected may produce the options that are shown or other options. When the X at 1216 is selected, the options may disappear. The options at the bottom of screen 1200 are just examples of the types of options that might be available to the booker. Any of these options may also be available to any other user. Any of these options may be selected and may present the user with a different screen. When the get charges option 1206 is selected, it may present the user with financial or invoice information about a particular transaction or set of transactions. The get confirmation option 1208 may present the user with confirmation and information about upcoming reservations or transactions. The get confirmation option 1208 may also include information confirming that a passenger has been picked up, dropped off, a transaction has been completed, etc.

The my history option 1210 may provide the user with past transaction information. This may be useful with transactions that are recurring, or if a passenger has a pleasant experience with a chauffeur, the booker may request that chauffeur in the future. It would also be helpful for many other reasons for the booker to be able to see past transactions. The my rewards option 1212 may provide information about rewards miles, points, redemption, etc. The service entity may provide a rewards or loyalty program. Also, the mobile application may also provide a method of keeping track of other reward and loyalty numbers and information. The refer a friend option 1214 may provide the user the ability to refer a friend or for a new user to give the name of a current customer that referred them. The refer a friend option 1214 may also provide a method of easily emailing, messaging, or sending information within the application to another person outside of the application. The call Fortis button 622 may include the same functionality described with respect to FIG. 600.

Figure 13:
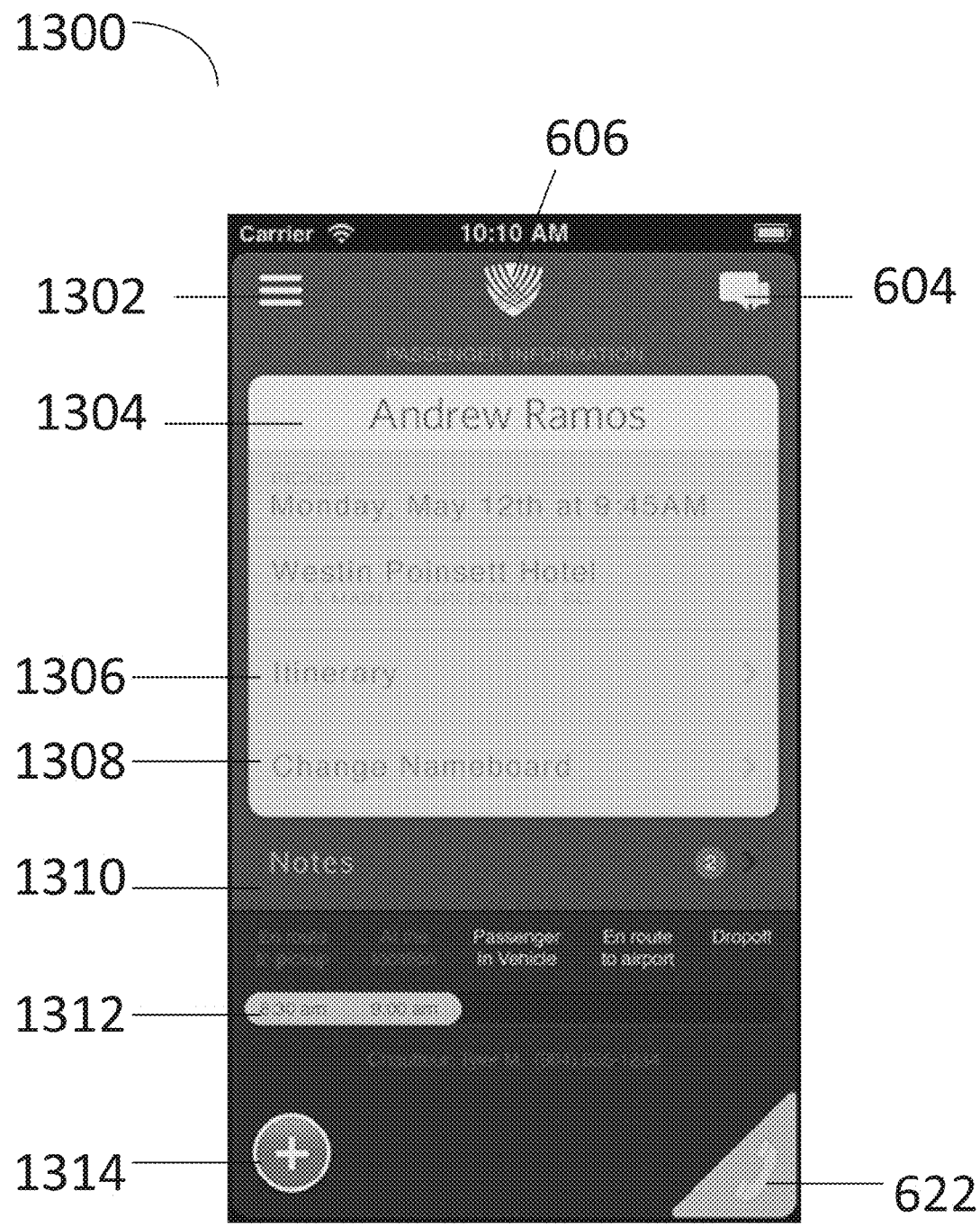
FIG. 13 is an exemplary screenshot of a transaction information screen for the booker in the mobile application.

Now with reference to FIG. 13, illustrated is an exemplary screenshot of a transaction information screen 1300 for the booker in the mobile application. Screen 1300 may be displayed after selecting one of the passengers 1204 of FIG. 12. Screen 1300 may include a back button 1302, the message center button 604, the home button 606, transaction information 1304, itinerary 1306, change nameboard option 1308, notes 1310, progress indicator 1312, menu button 1314, and call Fortis button 622.

When the back button 1302 is selected, it may direct the user back to screen 1200 of FIG. 12. The message center button 604 may direct the user to screen 800 of FIG. 8. The home button 606 may direct the user to screen 500 of FIG. 5, a main menu, or some other screen. The transaction information 1304 may include information relating to a transaction that is associated with the selected passenger. The information may include the name of the passenger(s), the date of the service, the place of the service, the itinerary 1306, and the change nameboard option 1308.

The itinerary 1306 may include itinerary information relating to the transaction. The selection of the itinerary 1306 may direct the user to screen 900 of FIG. 9. The change nameboard option 1308 may be the name on the sign for the pickup. For example, a passenger might want his personal name on the sign for pickup or the name of the company he represents or is meeting. Selecting the change nameboard option 1308 may direct the user to a screen that allows the user or passenger to select the name preference for the sign.

Notes 1310 may provide the booker or other user that ability to write notes that may be helpful in future transactions or just an easy place to write important notes. Notes 1310 may also have an indicator showing the number of notes stored for this particular transaction, passenger, etc. The selection of notes 1310 may also direct the user to a different screen.

The progress indicator 1312 may provide the booker an easy way to view updated progress information from the chauffeur. The progress indicator 1312 may also be selectable by the booker. The progress indicator 1312 may also illustrate the scheduled times at each of the points or destinations. By updating the mobile application, the service entity and any other relevant parties may be updated quickly and easily. In the illustrated example, the progress indicator 1312 provides a slider bar for viewing or updating the progress of the transaction. Once the item has been completed, the slider bar would move to the next item of the transaction. Also, the user may indicate that an item is completed by sliding the slide bar to the next item. This is just one illustration of how the progress indicator may function or be displayed. The progress indicator may also be a list. Examples of the items are en route to pickup, at the location, passenger in vehicle, en route to airport, drop off. Depending on the type of service, each progress indicator may be different. The menu button 1314 may display a customized menu of action items the user can perform. The action items may be customized by the selected role of the user. Screen 1300 may also display the phone number or contact information of the chauffeur. The call Fortis button 622 may be the same as described above with respect to screen 600 of FIG. 6.

Figure 14:
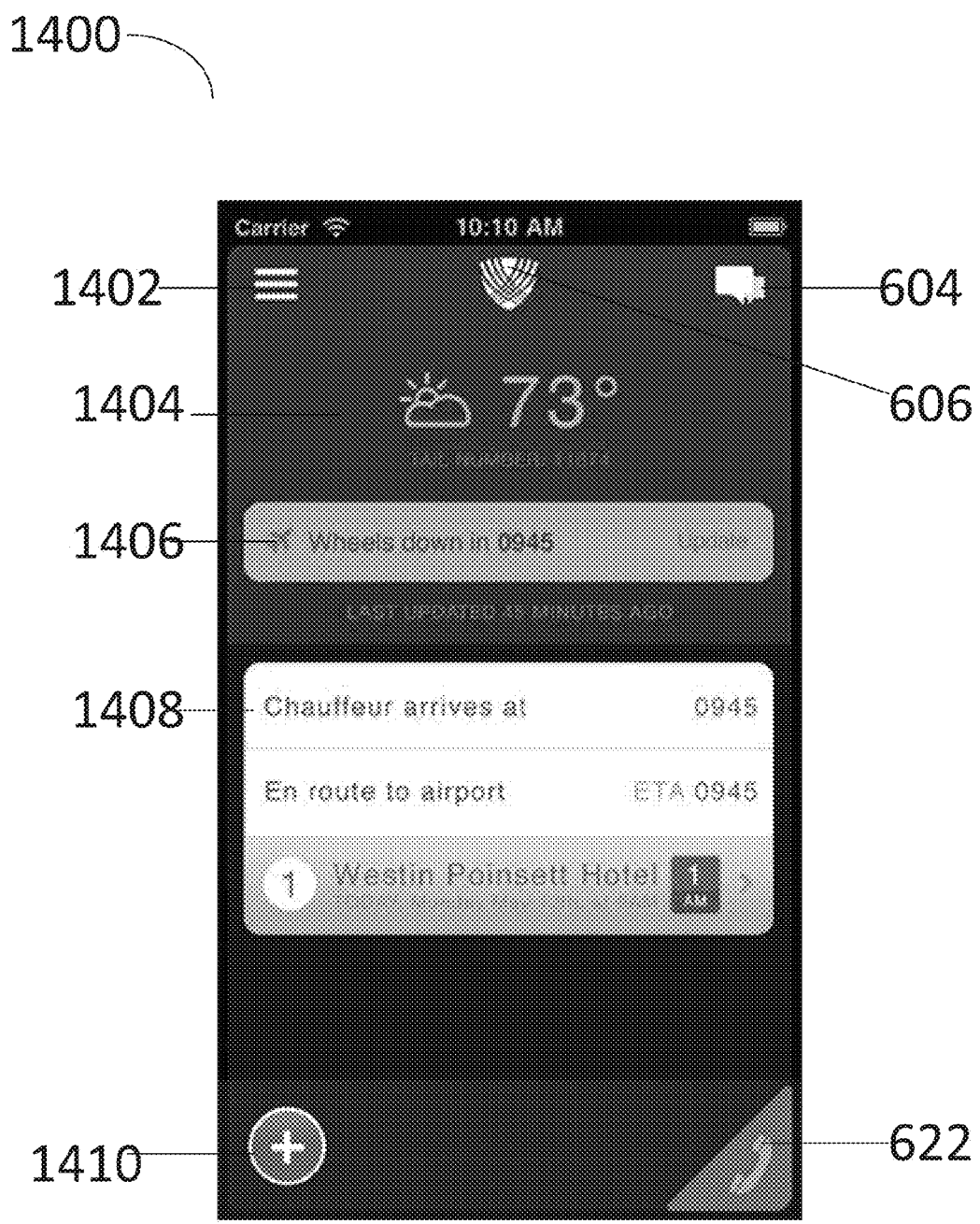
FIG. 14 is an exemplary screenshot of a pilot information screen in the mobile application.

Now with reference to FIG. 14, illustrated is an exemplary screenshot of a pilot information screen 1400 in the mobile application. Screen 1400 may be displayed after the pilot role selection 508 of FIG. 5. Screen 1400 may include a profile button 1402, the message center button 604, the home button 606, general information 1404, flight information 1406, transaction information 1408, a menu button 620, and the call Fortis button 622. The profile button 1402 may present the user with another screen that displays profile information about the pilot.

The message center button 604 may direct the user to screen 800 of FIG. 8. The home button 606 may direct the user to screen 500 of FIG. 5, a main menu or some other screen. The general information 1404 may include any information that is helpful to the pilot or any other user, such as weather, tail number, make/model of plane, origination and destination airports, etc. The flight information 1406 may include information such as takeoff time, landing time, delays, etc. The mobile application may provide for the flight information 1406 to be selectable and when selected, may present the user with another screen that lists even more flight information. This area may also include information as to when the mobile application, flight information, transaction information, etc. was last updated.

The transaction information 1408 may include information such as what time the chauffeur is scheduled to arrive with the passenger at the airport, progress information about the chauffeur and passenger, and an itinerary. The progress information may be updated when the chauffer and/or passenger updates the progress indicator in the mobile application. The itinerary section may be selectable and when it is selected, the user may be directed to screen 900 of FIG. 9. The menu button 1410 may display a customized menu of action items. The call Fortis button 622 may be the same as described above with respect to screen 600 of FIG. 6.

Figure 15:
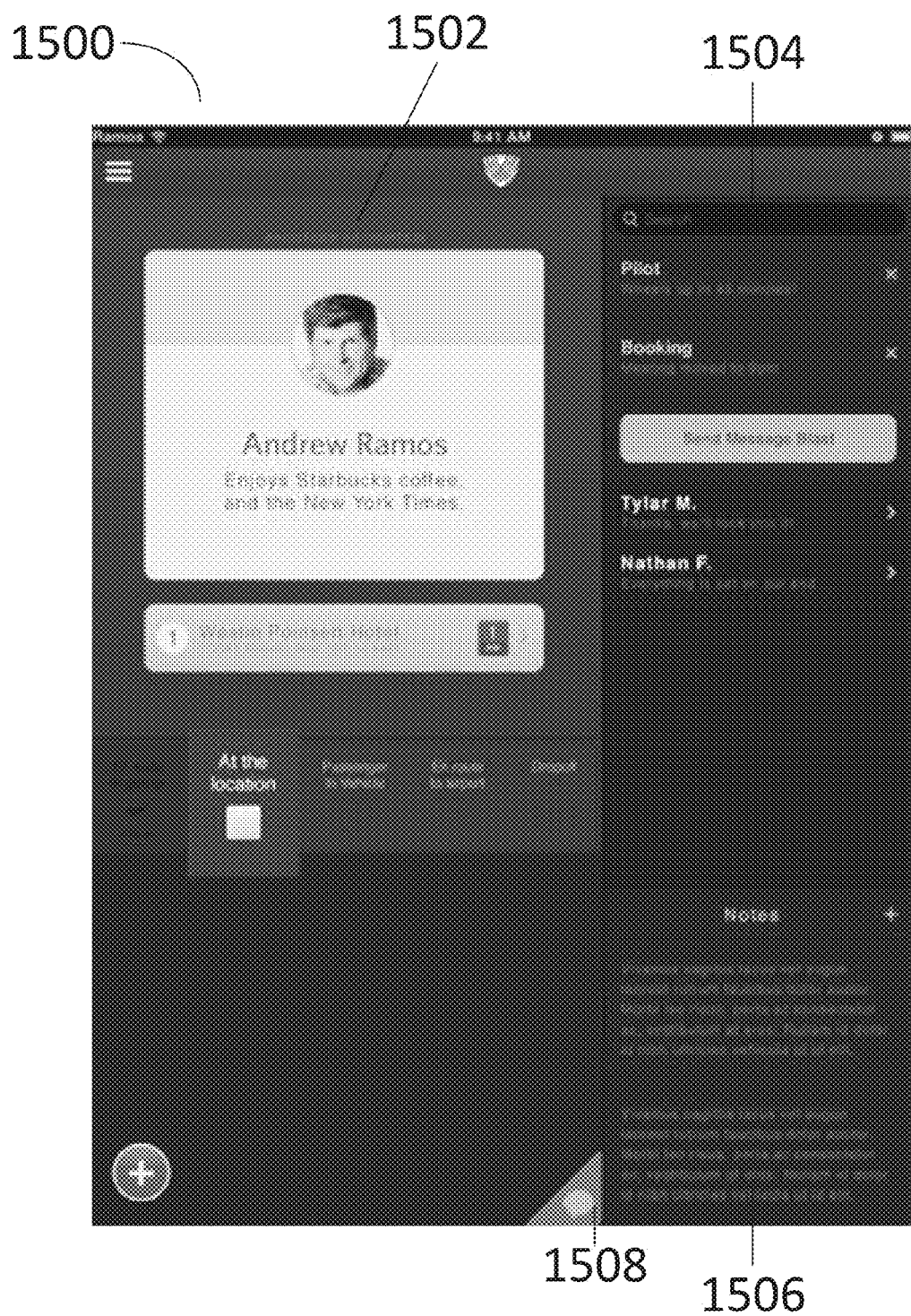
FIG. 15 is an exemplary screenshot of a chauffeur information screen in the mobile application on a tablet device.

Now with reference to FIG. 15, illustrated is an exemplary screenshot of a chauffeur information screen 1500 in the mobile application on a tablet device. Screen 1500 may include chauffeur information 1502, a message center 1504, and notes 1506. Because a tablet device's screen is larger than the screen for most smartphones, screen 1500 may include more information than what would normally be displayed on a smartphone. It should be appreciated that any of the above described examples of the present invention could also be implemented on a tablet device or any other mobile computing device. The chauffer information 1502 may be similar to screen 1000 of FIG. 10. Also, the message center 1504 may be similar to screen 800 of FIG. 8. Notes 1506 may be similar to the notes section that was described with respect to FIGS. 10 and 13. Screen 1500 may also include a message button 1508 for messaging any number of relevant parties, such as any users associated with the transaction and/or the service entity. Screen 1500 may also include the call Fortis button that is shown on FIGS. 6, 10, 12, 13, and 14.

The mobile device may operate in coordination with application software running external to the hand-held or mobile device to carry out or provide facilitating communication between a user's mobile device and a service entity. A computing device can include a computer, computer system or other programmable electronic device, including a client computer, a server computer, a portable computer (including a laptop and a tablet), a handheld computer, a mobile phone (including a smartphone), a gaming device, an embedded controller and any combination and/or equivalent thereof (including touchless devices). Moreover, the computing device may be implemented using one or more networked computers, e.g., in a cluster or other distributed computing system. It is understood that the exemplary environment discussed and illustrated is not intended to limit the present disclosure, and that other alternative hardware and/or software environments may be used without departing from the scope of this disclosure. The present techniques can be applied to devices other than hand-held devices, such as laptops or desktop computers.

For clarity, the terms "computing device", "computer device". "computer" and "machine" are understood to be interchangeable terms and shall be taken to include any collection of computing devices that individually or jointly execute a set (or multiple sets) of instructions to perform any one or more of the methods discussed herein.

The local storage can include volatile memory (such as RAM) and/or non-volatile memory (such as ROM as well as any supplemental levels of memory, including but not limited to cache memories, programmable or flash memories and read-only memories). The portable computing device or mobile device can include one or more processing devices (e.g, one or more central processing units (CPUs), one or more graphics processing units (GPUs), one or more microprocessors (μP) and similar and complementary devices) and optional media devices (e.g., a hard disk module, an optical disk module, etc.). Additionally, any storage techniques used in connection with the presently disclosed method and/or system may invariably be a combination of hardware and software.

In some instances, the term resident application is used to refer to an installed mobile application. However, as a matter of convenience mobile application and resident application are used interchangeably.

The mobile resident application, hand-held or mobile devices, server, or other discrete software or hardware components can communicate and are arranged to carry out the illustrative processes and applications described herein by way of sending a signal such as a packet, digital message, or a command within a communication to or between components (and act in response to the receipt of a signal to carry our processes) and between or through supporting software or hardware such as communicating with an operating system, communicating with another resident application through an API or the like, communicating between network elements using an Internet protocol or one or more layers of the OSI model, or communicating through an intermediate component.

The resident mobile application may operate in coordination with application software running external to the hand-held or mobile device to carry out or provide facilitating communication between a user's mobile device and a service entity. For example, the resident application may interact with another software to authenticate a user, check the status of a user's account, or carry out financial transactions. Providing software features that are subsidiary or are tangential to service entity can be incorporated into the mobile resident application or can be provided in conjunction or coordination with other software if desired.

One or more features illustratively described herein can be implemented individually or in various combinations. The present system, method, or related inventions also relate to a non-transient computer readable medium configured to carry out any one of the methods disclosed herein. The application can be set of instructions readable by a processor and stored on the non-transient computer readable medium. Such medium may be permanent or semi-permanent memory, such as hard drive, floppy drive, optical disk, flash memory, ROM, EPROM, EEPROM, etc., as would be known to those of ordinary skill in the art. Features or characteristics described in one context, process, or device are applicable to other context, process or devices described herein. The steps of the processes illustratively described herein can be performed in a different order, if desired. Also, steps could be added or removed from the processes illustratively described herein. The processes illustratively described herein can be implemented using the described examples of hardware and network configurations.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims to the invention.

What is claimed is:

1. A system for facilitating dedicated communication between specific users relating to a travel transaction for a single traveler, the system comprising:
   a travel resource mobile application that is configured to:
      be installed on a mobile communications device to add a new resident application on the mobile device and when installed associates a single traveler, wherein the single traveler is a user of the resident application, with an account in the resident application, and further wherein the user of the resident application and other users are included in a group which participates in the travel transaction for the single traveler, and each such users is assigned a role;
   provide travel information to each user of the group of users, wherein the travel information is based on each user's role; and
   provide secure communication between the group of users, wherein the group of users is restricted based on the travel transaction;
   wherein the travel resource mobile application is further configured to retrieve user contact information from an onboard source of locally-generated content on the mobile device to facilitate communication between the group of users while masking the contact information of each user;
   thus allowing the group of users to conduct the travel transaction for the traveler.

2. The system of claim 1, wherein the secure communication further includes chat functionality between the group of users.

3. The system of claim 1, wherein the travel resource mobile application is further configured to determine a location of at least one user from a group of users.

4. The system of claim 3, wherein the travel resource mobile application is further configured to determine a vehicle location of a car service of one user from a group of users.

5. The system of claim 4, wherein the travel resource mobile application is further configured to estimate an arrival time based on the vehicle location and the location of the user of the resident application.

6. The system of claim 4, wherein the travel resource mobile application is further configured to provide each user the ability to indicate their location to the other users in the group.

7. The system of claim 1, wherein the travel information is flight information associated the user of the resident application and the user providing flight services.

8. The system of claim 1, wherein the group of users is an exclusive group.

9. The system of claim 3, wherein the location of at least the user of the resident application is determined using GPS.

10. The system of claim 1, wherein the transaction is a travel itinerary associated with the user of the resident application.

11. The system of claim 1, wherein the travel information includes information provided by a travel agent, airline, car service, hotel, rental car company, or a travel company.

12. A method for facilitating dedicated communication between specific users relating to a travel transaction for a single traveler, which method comprises:
   providing a travel resource mobile application; installing the travel resource mobile application on a mobile communications device to add a new resident application on the mobile device and when installed associates a single traveler, wherein the single traveler is a user of the resident application with an account in the resident application, and further wherein the user of the resident application and other users are
   included in a group which participates in the travel transaction; assigning a role to each user of a group of users;

providing travel information to each user of the group based on each user's role; and providing secure communication between the group of users, wherein the group of users is restricted based on the travel transaction between the users of the group;

further comprising retrieving user contact information from the mobile device to facilitate communication between the group of users while masking the contact information of each user;

thus allowing the group of users to conduct the travel transaction for the traveler.

13. The method of claim 12, wherein the secure communication further includes chat functionality between the group of users.

14. The method of claim 13, wherein the transaction is a travel itinerary associated with one user of the group.

15. The method of claim 13, wherein the travel information is information provided by a travel agent, airline, car service, hotel, rental car company, or a travel company.

16. The method of claim 12, further comprising:
determining a location of at least one user from the group of users;
determining a vehicle location of a car service of another user of the group; and
estimating an arrival time based on the vehicle location and the at least one user's location.

17. The method of claim 16, further comprising providing each user with the ability to indicate their location to the other users in the group.

18. The method of claim 16, wherein the location of at least one user is determined using GPS.

* * * * *